United States Patent
Wilson et al.

(10) Patent No.: US 6,331,021 B1
(45) Date of Patent: Dec. 18, 2001

(54) FUEL SYSTEM VENT LINE

(75) Inventors: Johanne Wilson, Dearborn Heights; Laura Lou Cranmer, Novi; James Pickard, Troy; Kevin Baxter, Goodrich, all of MI (US)

(73) Assignee: Ford Global Technolobies, Inc., Dearborn, MI (US)

( * ) Notice: Subject to any disclaimer, the term of this patent is extended or adjusted under 35 U.S.C. 154(b) by 0 days.

(21) Appl. No.: 09/207,072

(22) Filed: Dec. 7, 1998

(51) Int. Cl.$^7$ ........................................... F16L 33/00
(52) U.S. Cl. ..................... 285/239; 285/253; 285/242; 285/226; 285/921
(58) Field of Search ..................... 285/242, 236, 285/226, 259, 252, 253, 903, 921, 239

(56) References Cited

U.S. PATENT DOCUMENTS

| | | | |
|---|---|---|---|
| 115,917 | * | 6/1871 | Wharton . |
| 4,099,744 | * | 7/1978 | Kutnyak et al. . |
| 4,224,167 | * | 9/1980 | Buttigieg . |
| 4,236,549 | * | 12/1980 | Salzmann . |
| 4,750,525 | | 6/1988 | Vaughan . |
| 4,944,536 | | 7/1990 | Bartholomew . |
| 4,972,875 | | 11/1990 | Beer et al. . |
| 5,111,858 | | 5/1992 | Aittama . |
| 5,139,043 | * | 8/1992 | Hyde et al. . |
| 5,209,267 | * | 5/1993 | Morin ................................. 285/242 |
| 5,445,360 | * | 8/1995 | Rody . |
| 5,466,016 | | 11/1995 | Briody et al. . |
| 5,474,048 | | 12/1995 | Yamazaki et al. . |
| 5,568,828 | | 10/1996 | Harris . |
| 5,682,924 | * | 11/1997 | Powell . |
| 5,687,762 | | 11/1997 | Teets et al. . |
| 5,984,375 | * | 11/1999 | Merrett ................................. 285/253 |

FOREIGN PATENT DOCUMENTS

| | | | |
|---|---|---|---|
| 35 06 206-A1 | * | 9/1986 | (DE) . |
| 2 227 064 | * | 7/1990 | (GB) . |

* cited by examiner

*Primary Examiner*—Lynne H. Browne
*Assistant Examiner*—Tomlyne A Malcolm
(74) *Attorney, Agent, or Firm*—Jerome R. Drouillard

(57) ABSTRACT

A vapor vent hose is adapted to be assembled to a nipple. The nipple has a first end, an outside diameter and a barb. The barb has a tapered first end adjacent the end of the nipple and a second end with a substantially radially extending face. The hose and nipple are provided in a fuel vapor system. The hose has a first end with an inside diameter fitting over the nipple. The first end has a cuff axially spaced from the end of the hose. The cuff is substantially undeformed radially after installation over the barb.

7 Claims, 3 Drawing Sheets

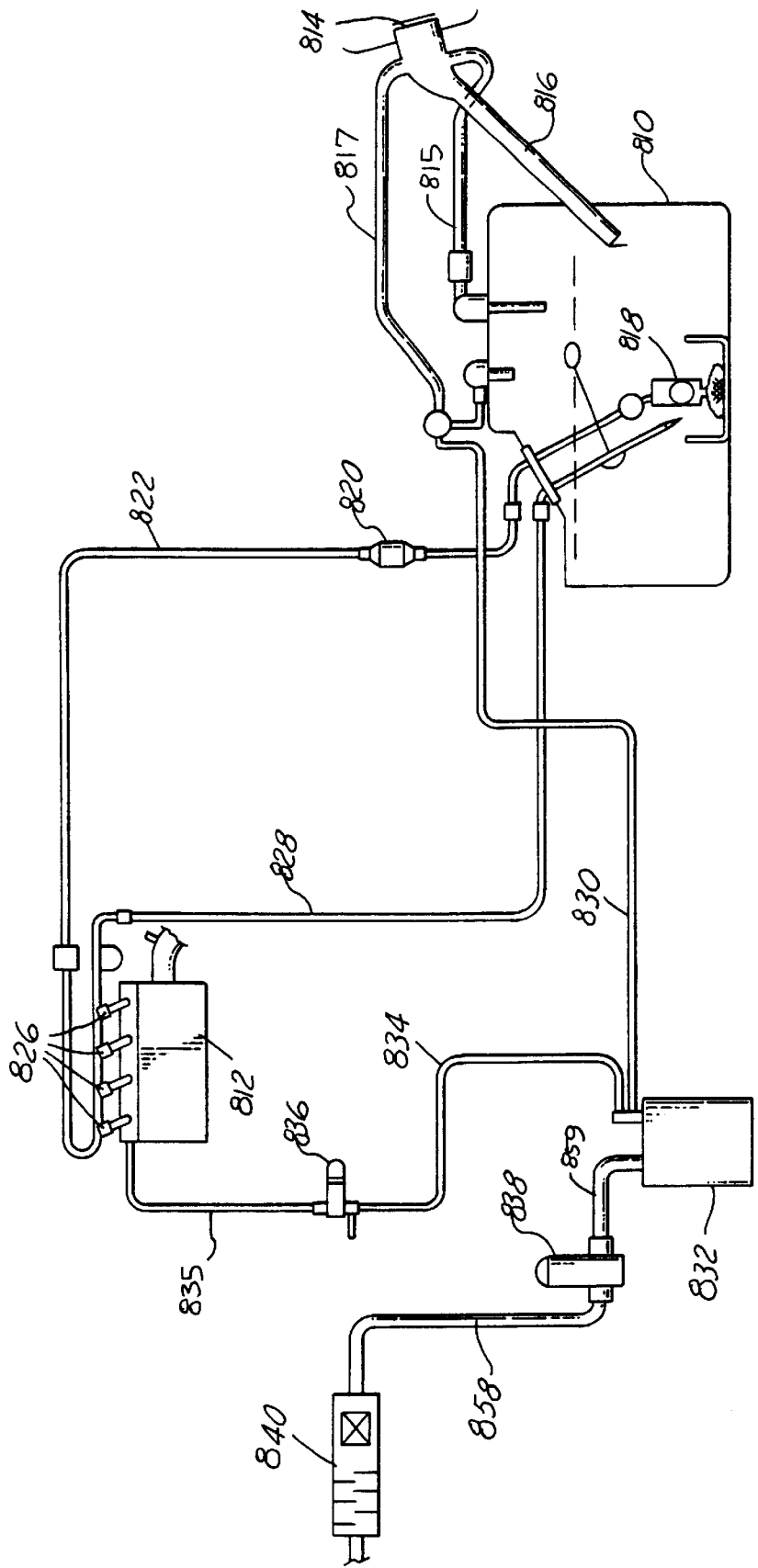

FUEL SYSTEM VENT LINE

FIELD OF THE INVENTION

The present invention relates to a system vent line and more particularly to such a vent line formed from a vacuum form process.

BACKGROUND OF THE INVENTION

U.S. Pat. No. 5,139,043 assigned to the assignee of the present invention, which is incorporated herein by reference, illustrates a vent line as shown in FIG. 2 of the '043 patent at 85 connected to a nipple 36. As illustrated therein, the vent line is formed from a rubber material and involves an interference fit to a barb formed on the nipple. Although this is an effective connection, it is difficult to assemble due to the force required to push the line over the barb. Furthermore, the expense of the rubber hose is greater than would be desirable.

U.S. Pat. No. 4,972,875, provides for a plastic fuel line formed from a vacuum form process, as illustrated in FIGS. 2–4 of the '875 patent. As illustrated in FIGS. 3 and 4, and described in column 3–4, the hose 64 of the '875 patent involves an interference fit of the side walls 2a barbed nipple. The hose of the '875 patent is directed toward high pressure fuel system and therefore an interference fit along the side walls is important to accommodate the high pressures. However, such an interference results in an excessively high force to assemble the hose to the nipple.

It would therefore be desirable to provide low cost vent vapor hose having a connection which is easy to assemble.

SUMMARY OF THE INVENTION

Accordingly, to provide an inexpensive hose which is easy to assemble, a vapor vent hose is provided to be assembled to a nipple having a radial barb. The hose includes a cuff that is substantially radially undeformed after installation to the barb.

BRIEF DESCRIPTION OF THE DRAWINGS

FIG. 8 schematically illustrates a fuel system with vent valve tubes according to the present invention.

DETAILED DESCRIPTION OF THE PREFERRED EMBODIMENTS

Figure 1:
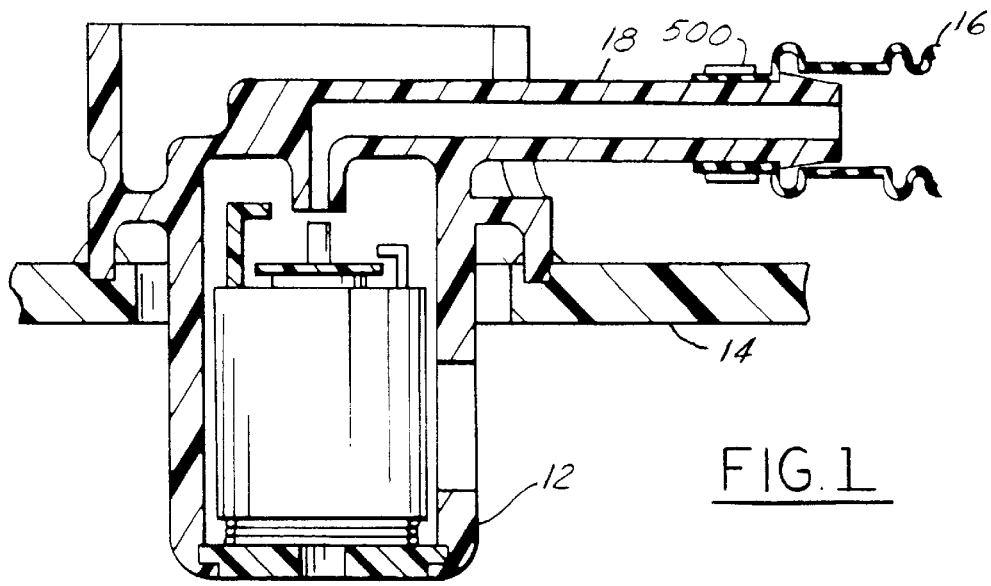
FIG. 1 illustrates a fuel tank vapor vent valve having a tube attached to it according to the present invention.
Figure 2:
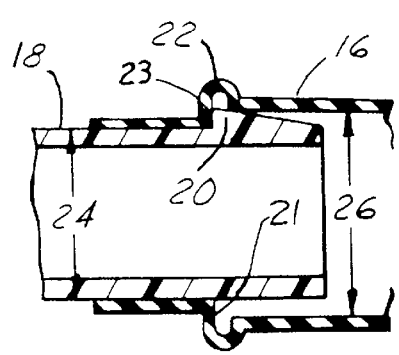
FIG. 2 is an illustration of a tube for a connection according to the present invention, in partial sectional view.

As shown in FIG. 1, a vapor vent valve 12 is provided in a fuel tank 14. A hose 16 is connected to the vent valve 12. As shown in FIG. 2, the vent valve 12 includes a nipple 18 to which the hose 16 is connected through a press fit operation. The nipple 18 has an outer diameter 24 engaged by the inside of the hose 16. In a preferred embodiment, the hose 16 has an inside diameter 26 having a clearance to the outside diameter 24 of the nipple. The nipple further includes a barb 20, which in a preferred embodiment is provided over half the circumference thereof, or 180 degrees, as shown in FIG. 2. Alternatively, the barb could extend for a lesser degree, depending on the level of retention desired.

The hose 16 includes a cuff 22 for engagement with the barb. The cuff includes a radially extending face 21 for engagement with a corresponding radially extending face 23 of the barb 20, thereby preventing pull-off of the hose 16 from the nipple 18. The cuff 22 provides for a clearance fit to the barb, or at most a slight interference fit, and therefore the hose 16 after installation is not substantially deformed by the barb 20, thereby making installation of the hose relatively easy, because the hose 16 does not require a large deflection about the circumference thereof during installation over the barb 20. Thus, the cuff 22 is substantially undeformed after the hose 16 is installed to the nipple 18, but the cuff 22 is deflected radially while the cuff 22 is installed over the barb 20. In a preferred embodiment, a clearance fit is provided between the inside diameter 26 of the hose to the outside diameter 24 of the nipple to make insertion effort relatively easy. Similarly, the open end of the hose 16 (the left of the hose 16 in FIG. 1) has a clearance fit or minimal interference fit to the nipple 18, thereby minimizing the installation effort thereof.

In a preferred embodiment, the hose 16 is vacuum formed from a nylon-6 material in a manner known to those skilled in the art. Preferably the hose 16 includes a plurality of convolutions 17 formed therein along the length thereof, the convolutions aiding in the flexibility of the hose 16. In FIG. 1, a clamp 500 is shown, but one skilled in the art appreciates, in view of the present disclosure that not all applications according to the present invention require such a clamp.

FIG. 8 shows an automotive powerplant having fuel vapor storage system (FVSS) integrally disposed therein, as described in detail in copending application Ser. No. 09/050,139, assigned to the assignee of the present invention, which is incorporated herein by reference. Although some of the powerplant's specific components, geometry, and component names may differ from vehicle to vehicle, the primary structure and structural components will remain constant. Primary components of the automotive powerplant are fuel tank 810 and internal combustion engine 812. Liquid fuel enters the vehicle by first being introduced to the fuel inlet opening 814 then traveling through fuel filler tube 816 into fuel tank 810. Fuel is sent by fuel pump 818 through fuel filter 820 and to engine 812 by way of fuel line 822, fuel rail 824, and fuel injectors 826. Optionally, some systems will recycle fuel unused by engine 812 by sending it back to fuel tank 810 via the fuel return line 828.

There are generally two primary circumstances wherein fuel vapor filled air is forced out of fuel tank 810. The first circumstance is during the above outlined filling of tank 810 and the other occurs when the fuel vapor in the tank expands (usually due to increased temperature of the fuel and/or fuel vapor) and forces some of the fuel vapor out of the tank. In either case, the fuel vapor filled air is sent through fuel recovery line 830 to carbon canister 832 where it is cleaned of its vapor before being sent to the atmosphere. Carbon canister 832 is filled with activated carbon which adsorbs the fuel vapor from the air flow.

Periodically, carbon canister 832, after absorbing and cleaning the fuel vapor filled air, must be desorbed, or purged, of the fuel vapor therein. This refreshing is done so that the canister can accommodate and absorb additional fuel vapor from fuel tank 810. Atmospheric air, to be used as purge air, is forced into and out of canister 832 and then sent through vapor purge line 834, and canister purge valve 836, directly to engine 812 for utilization.

As mentioned above, the outdoor air used as purge air must be cleaned of substantially all matter and moisture before it is introduced to canister vent valve 838 (CVW) and carbon canister 832. This is the purpose of the air filter assembly 840. In a preferred embodiment, the above-described hose connections are embodied in the connections between the canister 832 and vent valve 838 and air filter 840 within lines 859, 859. One skilled in the art may further apply the present invention to the other hoses as described below, particularly using a hose end made from a material comprising either a thermoplastic rubber (TPR) or thermoplastic elastomer (TPE), collectively called TPR/TPE, and/or hose clamps as described below. Examples of this include hoses 830, 834, 835, 815 and 817, as illustrated in FIG. 8. One skilled in the art further appreciates in an alternative embodiment that fuel lines, for example as provided in U.S. Pat. No. 4,972,875, could be modified to use a hose according to the present invention.

As appreciated by one skilled in the art, this hose 16 illustrated in FIGS. 1–8 is best suited for a low pressure fuel vapor vent system, although one skilled in the art could modify the present invention for other applications, especially using the clamp and/or elastomeric end. As further appreciated, those applications illustrated without an elastomeric end and/or a clamp are best suited for applications which do not require zero vapor loss. Examples include the vapor vent tubes 858, 859 provided after the canister 832 illustrated in FIG. 8.

Figure 3:
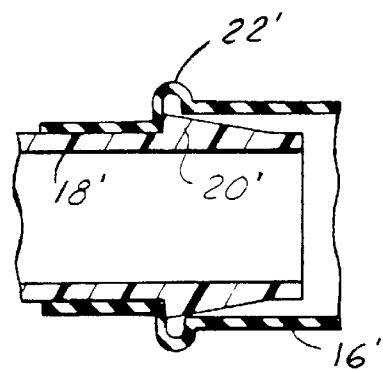
FIG. 3 is a partial sectional view of an alternative embodiment of an assembly according to the present invention.

FIG. 3 illustrates a further embodiment including a 360 degree barb 20' about the circumference of the nipple 18' for engagement with the cuff 22'. As appreciated by one skilled in the art, this embodiment normally requires a higher assembly force, but will be more difficult to pull the hose 16' from the nipple 18'.

Figure 4:
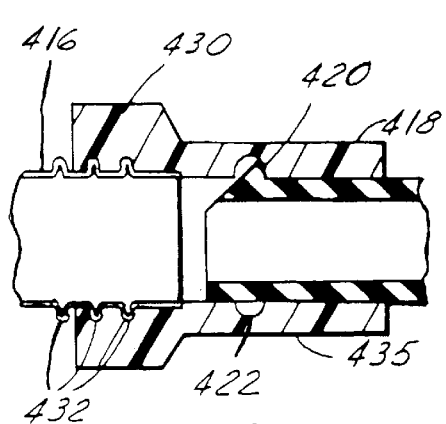
FIG. 4 is a partial sectional view of an alternative embodiment of a tube according to the present invention.

As shown in FIG. 4, a further alternative embodiment is illustrated. A vacuum formed hose 416 is provided having an elastomeric material 430 bonded to one end thereof. As shown in FIG. 4, the elastomeric material 430 includes a molded cuff 422 having an analogous shape and function to the cuff 22 provided in the embodiment of FIG. 2 which was vacuum formed into the nylon hose 16 of FIG. 2. Preferably, the hose 416 of this embodiment includes a plurality of molded ribs 432 to engage the molded elastomeric material 430 and provide positive retention thereto, as well as a leakproof seal therebetween. In a preferred embodiment, the elastomeric material 430 comprises a TPR/TPE material, a commercially available example of which includes SANTOPRENE.

Figure 5:
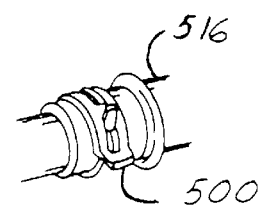
FIG. 5 is an isometric view of an alternative embodiment according to the present invention.

In a further alternative embodiment, a clamp 500 as provided in FIG. 5 is engaged with an outer diameter of the hose 516. The clamp 500 is preferably a spring type clamp of the constant pressure type as known to one skilled in the art. Such a clamp 500 is best suited for the TPR/TPE coupling 430 as provided in FIG. 4 to obtain an effective gas-tight seal between the TPR/TPE part 430 and the nipple 418. Alternatively, such a clamp 500 could be applied to the hose 16 provided in FIG. 2, particularly to enhance the pull-off of the tube and to improve sealing between the hose 16 and nipple 18.

In the embodiment of FIG. 4, as the TPR/TPE end 430 is assembled over the nipple 418, the clamp 500 (not shown) is then provided on the outer diameter of the TPR/TPE end 430 and clampingly engages the TPR/TPE material 430 to the nipple 418 at a first end thereof 435. This clamping arrangement provides a more positive engagement of the barb 420 on the nipple 418 to the cuff 422 in the hose and more positively prevents pull-off of the hose in addition to the sealing. Although illustrated as a barb of less than 360 degrees in FIG. 4, one skilled in the art appreciates extending the barb circumferentially in a manner similar to that described with reference to FIG. 3 above.

Figures 6, 7:
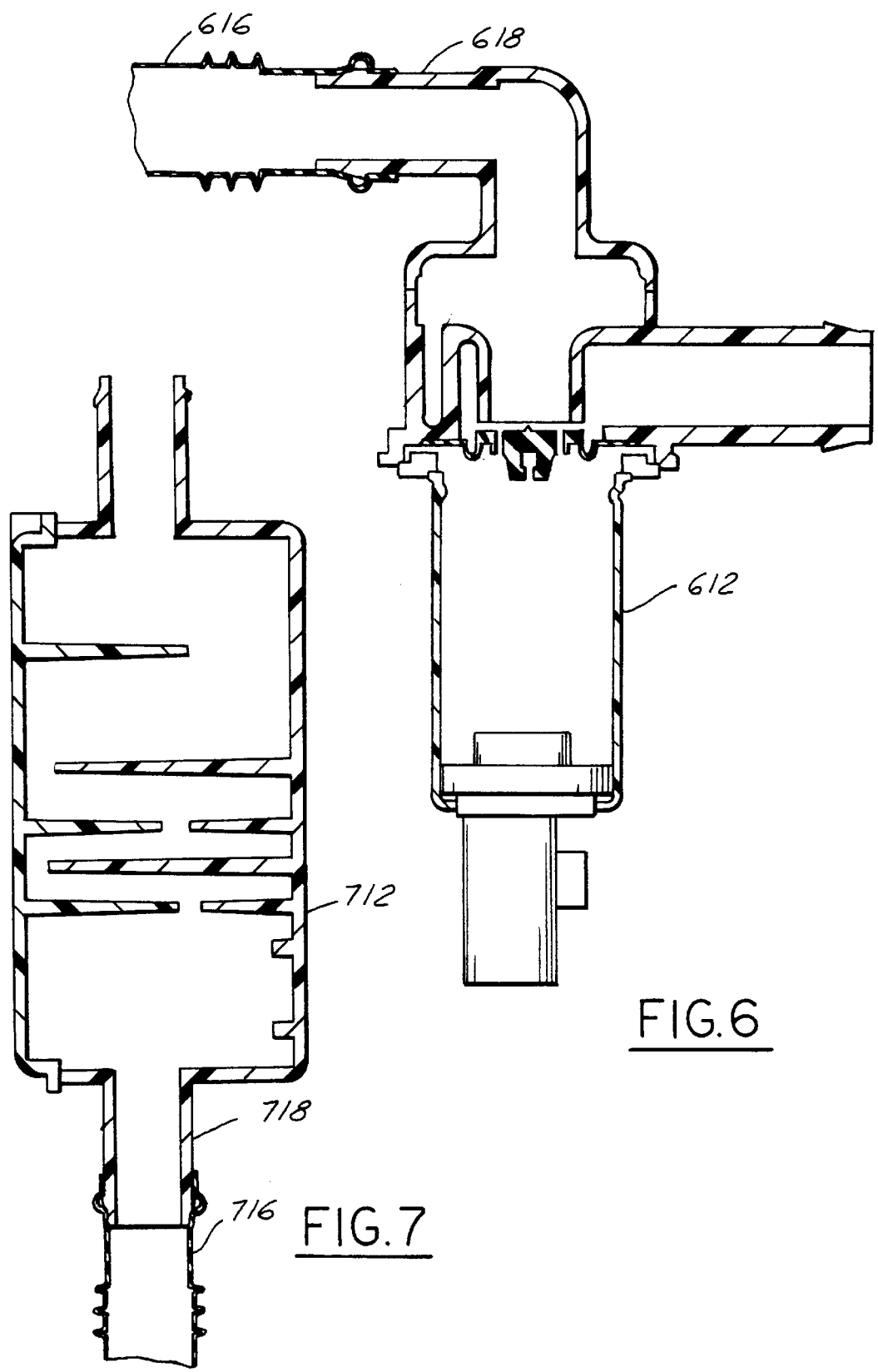
FIG. 6 illustrates a canister vent valve having a tube attached to it according to the present invention.
FIG. 7 illustrates a filter having a tube attached to it according to the present invention.

FIG. 6 illustrates a carbon canister vent valve 612 having a nipple 618 and a hose 616 attached thereto according to the present invention. Similarly, FIG. 7 illustrates an air filter 712 having a nipple 718 with a hose 716 attached thereto according to the present invention. One skilled in the art appreciates the air filter 840 of FIG. 8 is an application of such a connection. Likewise, carbon canister 832 of FIG. 8 may employ a similar connection with an outlet hose 859.

While certain representative embodiments and details have been shown for the purpose of illustrating the invention, it will be apparent to those skilled in the art that various changes in the arrangement provided herein may be made without departing from the scope of the invention, which is defined in the following claims.

We claim:

1. A fuel vapor system comprising:

a nipple having an outer surface with an outside diameter and a barb formed thereon projecting radially outwardly from the outer surface;

a hose having a first end with a cuff formed therein axially spaced from the first end of the hose, said cuff having an inside diameter that is substantially undeflected after installation over the barb, the cuff further comprising a wall for engagement with the barb and a radial clearance with a portion of the barb adjacent the engaging wall; and wherein the radial clearance remains in existence with the portion of the barb adjacent the engaging wall after installation thereto.

2. A fuel vapor system according to claim 1 wherein the barb extends circumferentially for approximately 180 degrees.

3. A fuel vapor system according to claim 1 wherein the hose is vacuum formed from a nylon material.

4. A fuel vapor system according to claim 3 wherein the hose further comprises a TPR/TPE material molded over the first end thereof and having the cuff formed in the TPR/TPE material.

5. A fuel vapor system according to claim 4 further comprising a clamp provided over the TPR/TPE material for clamping engagement with the nipple.

6. A fuel vapor system according to claim 5 further comprising said hose having a plurality of convolutions formed therein between the ends thereof.

7. A fuel vapor system according to claim 1 further comprising a clamp provided over the end of the hose for clamping engagement with the nipple.

* * * * *